United States Patent
Sugiyama (10) Patent No.: US 6,954,499 B2
(45) Date of Patent: *Oct. 11, 2005

(54) MOVING PICTURE CODING, CODED-MOVING PICTURE BITSTREAM CONVERSION AND CODED-MOVING PICTURE BITSTREAM MULTIPLEXING

(75) Inventor: Kenji Sugiyama, Yokosuka (JP)

(73) Assignee: Victor Company of Japan, LTD, Yokohama (JP)

( * ) Notice: Subject to any disclaimer, the term of this patent is extended or adjusted under 35 U.S.C. 154(b) by 666 days.

This patent is subject to a terminal disclaimer.

(21) Appl. No.: 09/812,784

(22) Filed: Mar. 15, 2001

(65) Prior Publication Data

US 2001/0026589 A1 Oct. 4, 2001

(30) Foreign Application Priority Data

Mar. 15, 2000 (JP) .................................... 2000-072075
Apr. 24, 2000 (JP) .................................... 2000-122747

(51) Int. Cl.⁷ .............................................. H04N 7/12

(52) U.S. Cl. ............................. 375/240.13; 375/240.12

(58) Field of Search ....................... 375/240.13, 240.25, 375/240.02, 240.07, 240.08, 240.15, 240.21, 240.12; 382/232, 236, 238; H04N 7/12

(56) References Cited

U.S. PATENT DOCUMENTS 5,668,601 A * 9/1997 Okada et al. .......... 375/240.25
6,005,627 A * 12/1999 Odaka et al. .......... 375/240.14

(Continued)

FOREIGN PATENT DOCUMENTS

EP          0675656 A2    10/1995

OTHER PUBLICATIONS

Miyaji et al, "A Method of Entropy Predictive Frame Rate Control", KDD R&D Laboratories, pp. 27–34, Jun. 12, 1996.

*Primary Examiner*—Nhon Diep
(74) *Attorney, Agent, or Firm*—Jacobson Holman PLLC (57) ABSTRACT

First pictures, set at a predetermined interval, to be used as reference pictures for inter-picture prediction of an incoming moving picture and second pictures different from the first pictures are coded. The first pictures are coded by intra-picture coding or unidirectional inter-picture predictive coding. The second pictures are coded by bidirectional inter-picture predictive coding using the first pictures or locally-decoded pictures of the first pictures as the reference pictures, to obtain a moving-picture bitstream. Motion activity is obtained on the incoming moving picture. The moving-picture bitstream is multiplexed with the information of motion activity. An incoming first moving-picture bitstream having bitstreams of the first and the second pictures coded as above at a first code transfer rate is converted into a second moving-picture bitstream at a second code transfer rate. Motion activity is obtained on the incoming first moving-picture bitstream. A decimation rate is set on the second pictures of the incoming first moving-picture bitstream according to at least the motion activity. The bitstreams of the second pictures are only decimated from the incoming first moving-picture bitstream at another predetermined interval according to the decimation rate. A plurality of incoming first moving-picture bitstreams are multiplexed into a moving-picture bitstream at a bit rate lower than a total bit rate of the incoming first moving-picture bitstreams. Each incoming first moving-picture bitstream has first moving-picture bitstreams of the first and the second pictures coded as above. A code amount of the multiplexed bitstream is obtained for each reproduction period as virtual buffer occupancy. A decimation rate is set on the second pictures of the incoming first moving-picture bitstreams according to the virtual buffer occupancy. The bitstreams of the second pictures are decimated from the incoming first moving-picture bitstreams at a predetermined interval according to the decimation rate, to obtain second bitstreams. The second bitstreams are multiplexed to obtain the multiplexed bitstream.

2 Claims, 5 Drawing Sheets

U.S. PATENT DOCUMENTS

| | | | |
|---|---|---|---|
| 6,023,296 A | * | 2/2000 | Lee et al. .............. 375/240.05 |
| 6,256,348 B1 | * | 7/2001 | Laczko et al. ......... 375/240.15 |
| 6,442,206 B1 | * | 8/2002 | Hrusecky ............... 375/240.21 |
| 6,493,466 B1 | * | 12/2002 | Honda et al. ............... 382/236 |
| 6,580,830 B1 | * | 6/2003 | Sato et al. .................. 382/238 |
| 6,798,835 B2 | * | 9/2004 | Sugiyama .............. 375/240.12 |
| 6,839,386 B2 | * | 1/2005 | Sato et al. ............. 375/240.25 |

* cited by examiner

MOVING PICTURE CODING, CODED-MOVING PICTURE BITSTREAM CONVERSION AND CODED-MOVING PICTURE BITSTREAM MULTIPLEXING

BACKGROUND OF THE INVENTION

The present invention relates to highly efficient coding of moving pictures into a bitstream at a small code amount for efficient video data transfer, storage and displaying, such as, MPEG-coding with inter-picture predictive coding, conversion of coded-moving picture bitstream at a different transfer rate, and also multiplexing of several coded-moving picture bitstreams into one bitstream.

Pictures under MPEG-coding are divided into three different types I-, P- and B-pictures. I-pictures (intra-coded pictures) are coded independently, entirely without reference to other pictures. P-pictures (unidirectionally predictive-coded pictures) are compressed by coding the differences the pictures and reference preceding I- or P-pictures. B-pictures (bidirectionally predictive-coded pictures) are also compressed by coding the differences the pictures and reference preceding or upcoming I- or P-pictures.

A coded B-picture bitstream can be removed from a coded bitstream because B-pictures are not used as reference pictures.

A coded bitstream of 30 frames/second with P-pictures for every 3 frames, for example, can be converted into a bitstream of 10 frames/second by removing B-picture streams only. The 10-frame/sec bitstream has a low transfer bit (code) rate in accordance with the removed B-picture amount.

In detail, a moving picture bitstream is supplied to a decimator to remove B-picture bitstreams according to decimation control data. The B-picture-removed bitstream is supplied to a buffer intermittently for each period in which B-pictures have been removed. The buffer holds such an intermittent input and outputs a sequential bitstream at a low transfer bit rate in accordance with the removed B-picture amount.

Moving pictures reproduced from such an output bitstream however cannot move smoothly on screen due to decrease in frame rate of the reproduced pictures which is caused by B-picture removal without respect to movement of original moving pictures.

In digital broadcasting, moving picture bitstreams on several channels are multiplexed into one bitstream suitable for a transfer line. A transfer bit rate of the multiplexed bitstream is basically the total of the moving picture bitstreams of the several channels.

An amount of codes required for obtaining a desired reproduced picture quality varies according to portions (periods) of moving pictures in moving picture coding. A transfer bit rate is set at the maximum code amount if it is a fixed rate. Portions (periods) of moving pictures that require a high transfer bit rate vary according to channels for multiplexing in several channels. A fixed transfer bit rate at the maximum code amount after multiplexing thus becomes smaller than the total of the maximum code amounts at the channels.

The more the channels to be multiplexed, the smaller the fixed transfer bit rate after multiplexing. This tendency lowers a transfer bit rate on transfer line by multiplexing. Each channel, however, carries a bitstream at a variable transfer rate, thus requiring a rate control, which results in an overall rate control over the several channels.

Such an overall rate control is achieved by a quantization control for every channel based on buffer occupancy on a virtual buffer provided after multiplexing. A reference value, that is, a quantization scale factor on quantization step width based on the buffer occupancy is returned to an encoder for each channel.

In detail, moving picture inputs on several channels are coded by MPEG-encoders, respectively, to bitstreams. The bitstreams on the several channels are multiplexed by a multiplexer into one MPEG-2 transport stream (ST).

The multiplexed bitstream is supplied to a code amount observer having a virtual buffer that corresponds to a buffer of an MPEG-decoder. The code amount observer observes buffer occupancy on the virtual buffer by detecting a frame code amount of a bitstream stored in the virtual buffer at decoding timing. The more the each frame code amount, the less the buffer occupancy, in other words, the less the each frame code amount, the more the buffer occupancy.

Information on buffer occupancy (BO) is supplied by the code amount observer to a rate (quantization) controller. A reference value, that is, a quantization scale factor on quantization step width is output by the rate controller based on the BO information and returned to the MPEG-encoders for the several channel. The quantization scale factor is used for all MPEG-encoders. The less the buffer occupancy, the larger the quantization scale factor, in other words, the more the buffer occupancy, the smaller the quantization scale factor.

Each MPEG-encoder is controlled by the quantization scale factor on quantization step width. The finer the quantization, the larger the code amount generated by each MPEG-encoder, in other words, the more coarse the quantization, the smaller the code amount generated by the MPEG-encoder.

The feed-back control on quantization scale is performed to the total code amount for all channels to achieve stable quantization in which code amounts are large for some channels but small for the other channels to a constant total code amount.

When several MPEG-encoders are controlled in the same way, they generate a large amount of codes for pictures that, for example, move rapidly on screen, thus requiring a high transfer rate whereas a small amount of codes for pictures that, for example, move very slowly, thus requiring a low transfer rate. Codes are thus shifted from channels that require a low amount of codes to other that require a high amount of codes.

Such multiplexing as described above requires a variable transfer rate also on a transfer line connecting MPEG-encoders and a multiplexer with feed-back control of a quantization scale factor to the encoders.

This type of processing is performed with a unit containing both MPEG-encoders and a multiplexer for high-speed transfer therebetween. It is difficult to multiplex bitstreams that have been coded at and transferred from a remote station. Therefore, in a system having a central station and a remote station, video signals with no compression are transferred from the remote station to the central station in which the video signals are encoded and multiplexed.

As discussed, an overall control of generated codes is required at the MPEG-encoder side, which is thus difficult when encoders are located in several remote places. Moreover, such an overall code amount control is impossible when multiplexing bitstreams that have already been encoded at remote places.

SUMMARY OF THE INVENTION

A purpose of the present invention is to provide an apparatus and a method of encoding moving pictures and converting a moving picture bitstream into another at a transfer rate by which moving pictures move smoothly on screen when decoded.

Another purpose of the present invention is to provide an apparatus and a method of multiplexing bitstreams of moving pictures that have already encoded with an optimum code amount reduction.

The present invention provides a coding apparatus for coding first pictures, that are set at a predetermined interval, to be used as reference pictures for inter-picture prediction of an incoming moving picture and coding second pictures different from the first pictures, the apparatus including: an encoder to encode the first pictures by intra-picture coding or unidirectional inter-picture predictive coding, and to encode the second pictures by bidirectional inter-picture predictive coding using the first pictures or locally-decoded pictures of the first pictures as the reference pictures, thus obtaining a moving-picture bitstream; a motion amount detector to obtain motion activity on the incoming moving picture; and a multiplexer to multiplex the moving-picture bitstream and the information of motion activity.

Moreover, the present invention provides a bitstream conversion apparatus for converting an incoming first moving-picture bitstream at a first code transfer rate to a second moving-picture bitstream at a second code transfer rate, the incoming first moving-picture bitstream having been obtained by coding first pictures set at a predetermined interval and used as reference pictures for inter-picture prediction of a moving picture to be coded and coding second pictures different from the first pictures, the apparatus including: a motion amount detector to obtain motion activity on the incoming first moving-picture bitstream; a decimation controller to set a decimation rate on the second pictures of the incoming first moving-picture bitstream according to at least the motion activity; and a bitstream decimator to decimate only bitstreams of the second pictures from the incoming first moving-picture bitstream at another predetermined interval according to the decimation rate.

Furthermore, the present invention provides a bitstream multiplexing apparatus for multiplexing a plurality of incoming first moving-picture bitstreams into a moving-picture bitstream at a bit rate lower than a total bit rate of the incoming first moving-picture bitstreams, each incoming first moving-picture bitstream having first moving-picture bitstreams of first pictures used as reference pictures for inter-picture prediction and bitstreams of second pictures other than the first pictures, the apparatus including: a decimation controller to set a decimation rate on the second the pictures of the incoming first moving-picture bitstreams according to virtual buffer occupancy to the multiplexed moving-picture bitstream; a bitstream decimator to decimate the bitstreams of the second pictures from the incoming first moving-picture bitstreams at a predetermined interval according to the decimation rate, thus obtaining second bitstreams; a multiplexer to multiplex the second bitstreams to obtain the multiplexed bitstream; and virtual buffer means for obtaining a code amount of the multiplexed bitstream for each reproduction period as the virtual buffer occupancy.

Moreover, the present invention provides a method of coding first pictures, that are set at a predetermined interval, to be used as reference pictures for inter-picture prediction of an incoming moving picture and coding second pictures different from the first pictures. The first pictures are coded by intra-picture coding or unidirectional inter-picture predictive coding, and the second pictures are coded by bidirectional inter-picture predictive coding using the first pictures or locally-decoded pictures of the first pictures as the reference pictures, thus obtaining a moving-picture bitstream. Motion activity is obtained on the incoming moving picture. The moving-picture bitstream and the information of motion activity are multiplexed.

Moreover, the present invention provides a method of converting an incoming first moving-picture bitstream at a first code transfer rate to a second moving-picture bitstream at a second code transfer rate, the incoming first moving-picture bitstream having been obtained by coding first pictures set at a predetermined interval and used as reference pictures for inter-picture prediction of a moving picture to be coded and coding second pictures different from the first pictures. Motion activity is obtained on the incoming first moving-picture bitstream. A decimation rate is set on the second pictures of the incoming first moving-picture bitstream according to at least the motion activity. Bitstreams of the second pictures only are decimated from the incoming first moving-picture bitstream at another predetermined interval according to the decimation rate.

Furthermore, the present invention provides a method of multiplexing a plurality of incoming first moving-picture bitstreams into a moving-picture bitstream at a bit rate lower than a total bit rate of the incoming first moving-picture bitstreams, each incoming first moving-picture bitstream having first moving-picture bitstreams of first pictures used as reference pictures for inter-picture prediction and bitstreams of second pictures other than the first pictures. A code amount of the multiplexed bitstream is obtained for each reproduction period as virtual buffer occupancy. A decimation rate is set on the second pictures of the incoming first moving-picture bitstreams according to the virtual buffer occupancy. The bitstreams of the second pictures are decimated from the incoming first moving-picture bitstreams at a predetermined interval according to the decimation rate, thus obtaining second bitstreams. The second bitstreams are multiplexed to obtain the multiplexed bitstream.

DETAILED DESCRIPTION OF PREFERRED EMBODIMENTS

Preferred embodiments according to the present invention will be disclosed with reference to the attached drawings.

A concept of coding according to the present invention is that a decimation rate (or picture rate) on B-pictures is controlled in accordance with motion activity of moving pictures.

In one embodiment, bitstreams of B-pictures that are not used as reference frames for predictive coding are less decimated for moving picture portions of high motion activity whereas decimated more for moving picture portions of low motion activity.

This processing keeps high picture quality which would otherwise be lowered due to decimation of B-pictures. This is based on the following facts: According to human visual characteristics, it is a problem for moving picture portions of high motion activity that moving pictures move not smoothly on screen when decoded due to decrease in picture rate. This is, however, not a problem for moving picture portions of low motion activity.

Moving Picture Coding

Figure 1:
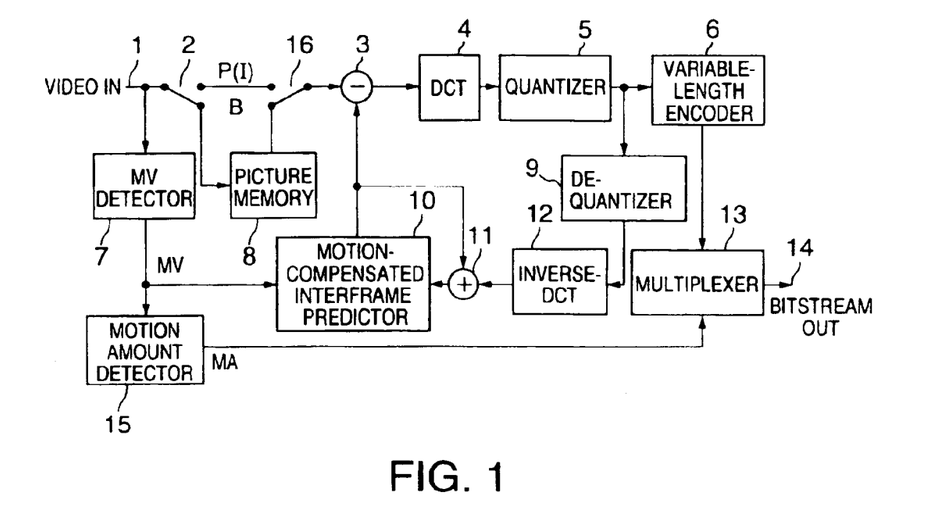
FIG. 1 shows a block diagram of a motion-compensated coding apparatus as a preferred embodiment of a moving picture coding apparatus according to the present invention.

Disclosed first with reference to FIG. 1 is a motion-compensated coding apparatus as a preferred embodiment of a moving picture coding apparatus according to the present invention.

A moving-picture video signal is supplied to a switch 2 and a motion vector (MV) detector 7 through an input terminal 1. The input video signal carries progressive moving pictures of 60 fps (frame per second), or 480 p (p: progressive). The switch 2 and another switch 16 are turned on/off concurrently for supplying one I- or P-picture to a subtracter 3 for every sixth frame and the remaining B-pictures to a picture memory 8.

B-pictures have been stored in the picture memory 8 until coding of the preceding I- or P-picture is finished. In this embodiment, 5-frame B-pictures have been stored in the picture memory 8 for a 6-frame period until coding of one I- or P-picture per sixth frame is finished, and supplied to the subtractor 3 via the switch 16.

A predictive signal supplied by a motion-compensated interframe predictor 10 is subtracted from each I- or P-picture video signal by the subtracter 3 for generation of a predictive error signal. The predictive error signal is supplied to a discrete cosine transformer (DCT) 4. I-picture video signals are supplied to the DCT4 as they are because of no predictive error signal. The predictive error signal is transformed into DCT coefficients by DCT-processing and supplied to a quantizer 5. The DCT coefficients are quantized at a predetermined quantization step width to become fixed-length codes and supplied to a variable-length encoder 6. The fixed-length DCT coefficients (predictive error signal) are compressed by using variable-length codes and supplied to a multiplexer 13. The coded predictive error signal is multiplexed with a motion activity (MA) signal supplied by a motion amount detector 15 to become a bitstream. The bitstream is output through an output terminal 14.

The fixed-length DCT coefficients for I- or P-pictures are further supplied by the quantizer 5 to an De-quantizer 9 and then an inverse-DCT 12. The De-quantizer 9 and the inverse-DCT 12 perform processing that is inverse of processing performed by the DCT 4 and quantizer 5, to reproduce the predictive error signal.

The reproduced predictive error signal is supplied to an adder 11 and added to a predictive signal, to reproduce a moving picture signal (locally decoded moving picture). The reproduced moving picture signal is supplied to the motion-compensated interframe predictor 10.

The interframe predictor 10 stores the reproduced moving picture signal for I- or P-pictures as a reference picture signal and performs motion compensation in accordance with a motion vector (MV) detected by the MV detector 7, to generate a predictive signal which is then supplied to the subtracter 3 and adder 11.

Predictive signal generation depends on I-, P- and B-pictures. In detail, no predictive signal is generated for an incoming I-picture; a predictive signal is generated for an incoming P-picture based on a preceding I- or P-picture (unidirectional prediction); and a predictive signal is generated for an incoming B-picture based on preceding and/or upcoming I- or P-pictures (bidirectional prediction).

Motion activity detection performed by the MV detector 7 and motion amount detector 15 is disclosed in detail.

The MV detector 7 detects a spatial movement amount of a reference frame with respect to a frame to be coded for every (16×16) blocks. The detected spatial movement amount is supplied as a motion vector (MV) to the motion-compensated interframe predictor 10 and motion amount detector 15. The motion vector is detected for both I- and P-pictures in this embodiment, although no motion vector is detected for I-pictures in well-known coding apparatus.

The motion amount detector 15 detects motion activity based on the incoming motion vector. The detected motion activity is supplied to the multiplexer 13. Motion activity detection is performed per 0.1 second for each segment between a P (I)-picture and the next P (I)-picture.

The motion vector used for motion activity detection is a motion vector used for P-picture prediction. In detail, motion activity is detected by using a horizontal component Mvx (i, j) and a vertical component MVy (i, j) of a motion vector used for P-picture coding in which "i" and "j" indicate horizontal and vertical positions, respectively, on one frame when movement of one pixel is 1.0.

Motion activity MA1 for the entire frame is obtained according to the following equation (1).

$$MA1 = \left(\sum_{i=0}^{44} \sum_{j=0}^{29} MVx(i, j)^2 + MVy(i, j)^2\right) / 1350 \quad (1)$$

Another technique to detect motion activity is deciding how many blocks on which pictures portions move rapidly on screen. This is based on the fact that a picture portion that is moving rapidly on screen is very noticeable even though an entire picture is not moving.

In detail, motion activity MA2 for the entire frame is obtained based on a degree of motion on each block MVD(i, j) according to the following equations (2) and (3).

$$MVD(i, j) = |MVx(i, j)| + |MVy(i, j)| \quad (2)$$

$$MA2 = 4 \cdot MD64 + MD32 \quad (3)$$

where MD64 is the number of blocks within one frame for MVD(i, j)≧64, and MD32 is the number of blocks within one frame for MVD(i, j)≧32.

Moving Picture Conversion

Figure 2:
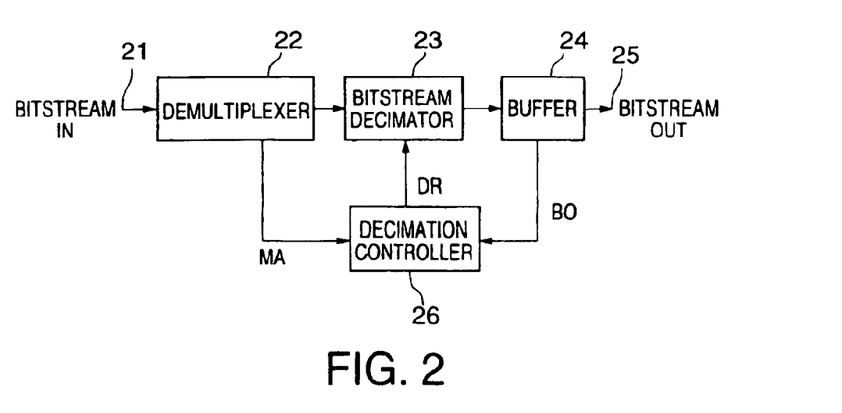
FIG. 2 shows a block diagram of the first preferred embodiment of a moving picture bitstream conversion apparatus according to the present invention.

Disclosed next with reference to FIG. 2 is the first preferred embodiment of a moving-picture bitstream conversion apparatus according to the present invention. The conversion apparatus is suitable to convert a bitstream transferred from the motion-compensated coding apparatus shown in FIG. 1 into another bitstream at a another transfer rate.

A moving-picture bitstream transferred through an input terminal 21, for instance, from the motion-compensated coding apparatus shown in FIG. 1, is supplied to a demultiplexer 22 and separated into a moving-picture bitstream and motion activity (MA). The moving-picture bitstream and the motion activity are supplied to a bitstream decimator 23 and a decimation controller 26, respectively.

B-picture bitstreams are removed from the moving-picture bitstream supplied to the bitstream decimator 23 based on a picture rate (or decimation rate DR) set at the decimation controller 26. The remaining bitstream is supplied to a buffer 24 intermittently for each period in which B-pictures have been removed. The buffer 24 holds the intermittent input and outputs a sequential bitstream at a low transfer bit rate in accordance with the removed B-picture amount.

A picture rate (decimation rate) is set at the decimation controller 26 for each segment between a P (I)-picture and the next P (I)-picture during which motion activity is detected.

The following are four types of picture rate (decimation rate) and the corresponding decimation patterns for decimating only B-pictures for reproducing uniform pictures after decimation:

(1) 60 fps (0/5): no B-pictures decimated, or all pictures remain for each segment;

(2) 30 fps (3/5): three B-pictures decimated, or two B-pictures remain for each segment;

(3) 20 fps (4/5): four B-pictures decimated, or one B-picture remain for each segment; and (4) 10 fps (5/5): all (five) B-pictures decimated, or no B-pictures remain for each segment.

Five B-pictures in total are subjected to decimation in this embodiment so as to correspond to the motion-compensated coding apparatus shown in FIG. 1 in that 5-frame B-pictures are stored in the picture memory 8 for a 6-frame period until coding of one I- or P-picture per sixth frame is finished, as disclosed.

Figure 3:
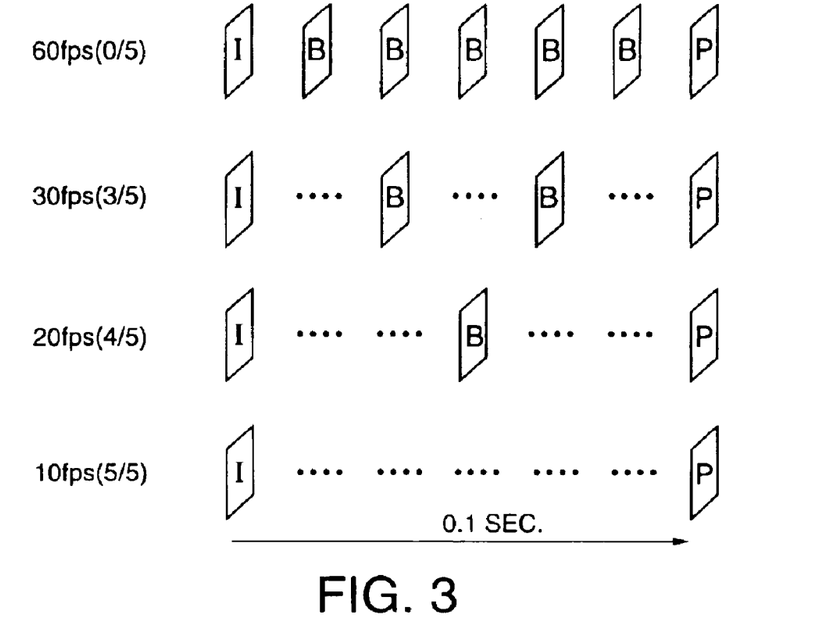
FIG. 3 illustrates decimation of B-picture according to a decimation rate (frame rate) decided by the moving picture bitstream conversion apparatus shown in FIG. 2.

FIG. 3 illustrates which B-pictures are decimated according to the picture rate (decimation rate). B-picture(s) to be decimated is (are) decided so that the remaining B-picture(s) and the preceding and the following I(P)-pictures after decimation are arranged at a constant interval.

A moving-picture video signal mostly carries 60 frames (or fields) according to a limit on detection of a flicker on screen, however, such number of frames (or fields) are not always required for every moving picture. For example, cinema films require 24 frames per second (fps), so that un-smooth movement (jaggy movement, etc.) is noticeable only for rapidly moving scenes at 30 fps, however, not noticeable at 20 fps whereas noticeable at 10 fps except stationary scenes.

Therefore, decimation control in which a picture rate (decimation rate) is switched among 60 fps only for rapid movement, 30 fps for frequent movement, 20 fps for infrequent movement, and 10 fps for almost stationary scenes offers smooth and natural movement on screen when moving pictures are reproduced.

Discussed next is how a transfer rate varies according to B-picture decimation as disclosed above.

Although depending on moving pictures, a code amount ratio of I-pictures to P-pictures is about 3:1 and that of P-pictures to B-pictures is also about 3:1.

For example, a bitstream at bit rate of 6.0 Mbps before decimation is composed of I-pictures of 700 kbits, P-pictures of 200 kbits and B-pictures of 60 kbits on average.

When the 6.0-Mbps bitstream is decimated at a rate of 30 fps (3/5), three B-pictures per segment, or B-pictures of 180 kbits (60 kbits×3) are decimated for 0.1 seconds, so that the bitstream becomes a 4.2-Mbps bitstream.

When the 6.0-Mbps bitstream is decimated at a rate of 20 fps (4/5), four B-pictures per segment, or B-pictures of 240 kbits (60 kbits×4) are decimated for 0.1 seconds, so that the bitstream becomes a 3.6-Mbps bitstream.

Moreover, when the 6.0-Mbps bitstream is decimated at a rate of 10 fps (5/5), five B-pictures per segment, or B-pictures of 300 kbits (60 kbits×5) are decimated for 0.1 seconds, so that the bitstream becomes a 3.0-Mbps bitstream.

It is apparent that a transfer rate is decreased to about 50% step by step according to the picture rate (decimation rate) control. The amount of codes to be removed is, however, restricted in some extent for segments of small motion activity at a low picture rate because such segments have a small amount of B-picture codes.

Figure 4:
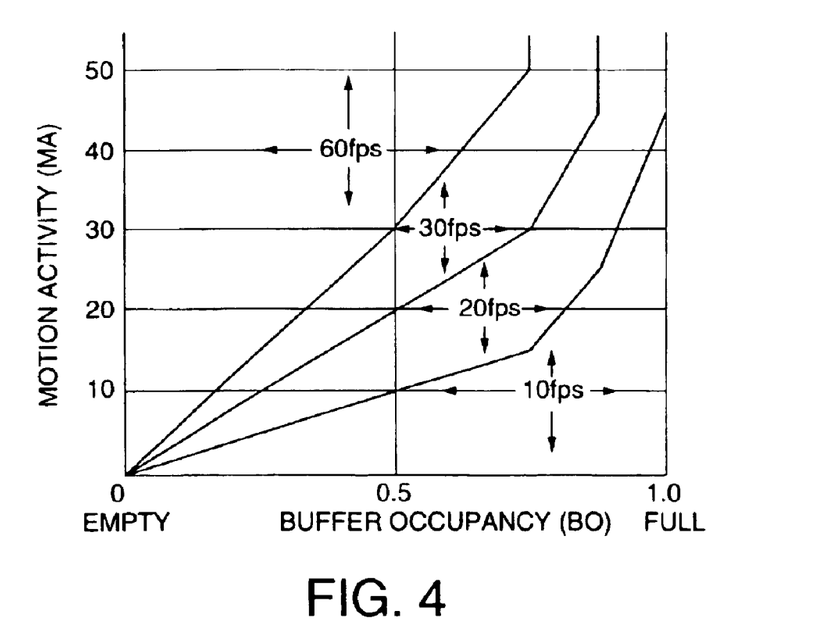
FIG. 4 illustrates decimation rate (frame rate) control performed by the moving picture bitstream conversion apparatus shown in FIG. 2.

In the first embodiment, a picture rate (decimation rate) is controlled according to motion activity and also buffer occupancy (BO) on the buffer 24 shown in FIG. 2. This is illustrated in FIG. 4. Buffer occupancy closer to zero (the buffer 24 being almost empty) does not allow decrease in picture rate (decimation rate) even though motion activity (MA) is relatively small. On the other hand, buffer occupancy closer to 1.0 (the buffer 24 being almost full) does not allow increase in picture rate (decimation rate) even though motion activity is relatively large. A feed-back control is performed as shown in FIG. 2 from the buffer 24 to the decimation controller 26 so that an output code rate becomes a predetermined value.

A recommendable transfer bit rate to be converted in this embodiment is about 25% of an input transfer bit rate in accordance with a controllable range and reproduced picture quality. For example, a 6.0-Mbs input bitstream transfer rate is converted into about 4.5 Mbps.

Figure 5:
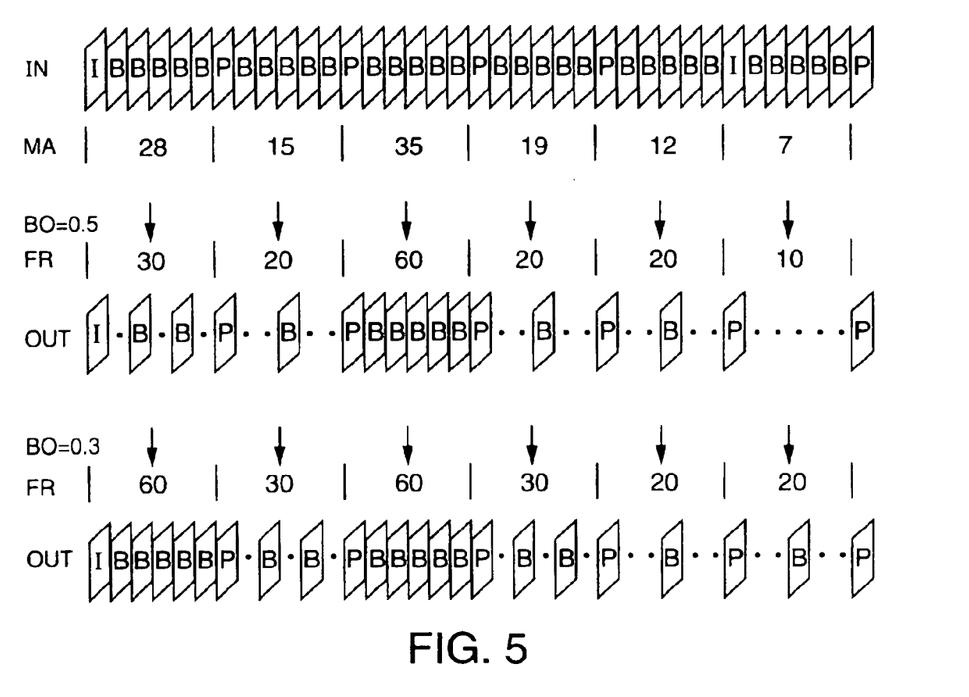
FIG. 5 illustrates frame rate control with two value of buffer occupancy performed by the moving picture bitstream conversion apparatus shown in FIG. 2.

An example of transfer rate conversion is illustrated in FIG. 5. Illustrated here is B-picture decimation controlled as shown in FIG. 4 at buffer occupancy (BO) is 0.5 and 0.3. The nearer the BO to 1.0 (full) and the smaller the motion activity (MA), the more B-pictures are decimated.

The bitstream conversion is performed from a fixed transfer bit rate to another fixed transfer bit rate, as disclosed. Not only that, the bitstream conversion is performed, for example, from a variable transfer bit rate to another variable transfer bit rate, from a fixed transfer bit rate to a variable transfer bit rate and from a variable transfer bit rate to a fixed transfer bit rate on asynchronous transfer mode (ATM) line. Such bitstream conversion on ATM line can be performed according to the embodiment shown in FIG. 2, which is apparent from the foregoing disclosure for a skilled in the art without a detail description.

Figure 6:
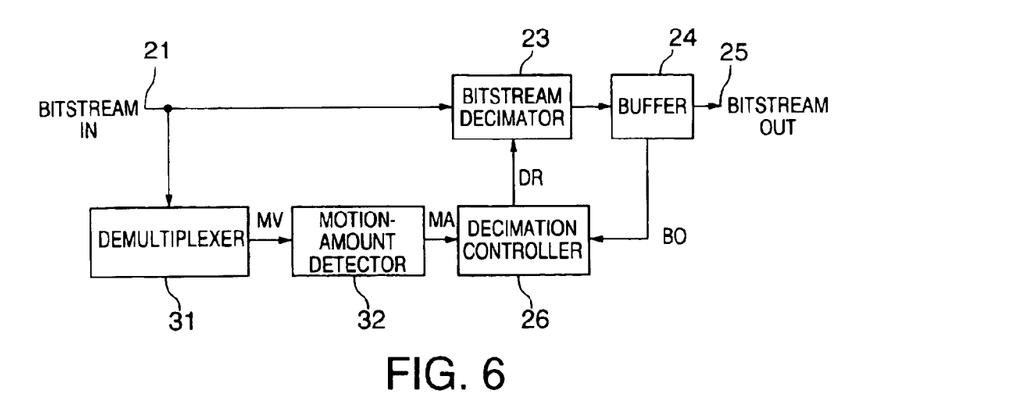
FIG. 6 shows a block diagram of the second preferred embodiment of a moving picture bitstream conversion apparatus according to the present invention.

Disclosed next with reference to FIG. 6 is the second preferred embodiment of a moving picture bitstream conversion apparatus according to the present invention.

Elements in this embodiment that are the same as or analogous to elements in the first embodiment (FIG. 2) are referenced by the same reference numbers.

This conversion apparatus is also suitable to convert a bitstream transferred from the motion-compensated coding apparatus shown in FIG. 1 into another stream at a different transfer rate.

Moreover, this conversion apparatus is also suitable to conversion of a bitstream transferred from a well-known motion-compensated coding apparatus with no motion activity detection because this conversion apparatus performs motion activity detection.

A moving-picture bitstream transferred through an input terminal 21, for instance, from the motion-compensated coding apparatus shown in FIG. 1, is supplied to a bitstream decimator 23 and a demultiplexer 31.

A motion vector (MV) is separated from the bitstream supplied to the demultiplexer 31 and supplied to a motion amount detector 32.

B-picture bitstreams are removed from the moving-picture bitstream supplied to the bitstream decimator 23 based on a picture rate (or decimation rate DR) set at a decimation controller 26. The remaining bitstream is supplied to a buffer 24 intermittently for each period in which B-pictures have been removed. The buffer 24 holds the intermittent input and outputs a sequential bitstream at a low transfer bit rate in accordance with the removed B-picture amount.

The motion amount detector 32 detects motion activity (MA) based on the motion vector (MV) like the motion amount detector 15 shown in FIG. 1. However, an incoming bitstream caries intra-coded blocks with no motion vectors for I- and P-pictures. For I-pictures, the motion amount detector 32 applies distance compensation to a motion vector of the preceding B-picture to obtain motion activity. On the other hand, for intra-coded blocks of P-pictures, a predetermined relatively large motion vector is applied thereto to obtain motion activity because such blocks often carry moving pictures of rapid movement.

Like the first embodiment shown in FIG. 2, the decimation controller 26 set a picture rate (or decimation rate) in accordance with the obtained motion activity. A decimation rate (frame rate) can be set in accordance with motion activity (MA) and also buffer occupancy (BO) on the buffer 24.

When a moving-picture bitstream is transferred from the motion-compensated coding apparatus shown in FIG. 1, the demultiplexer 31 can separate motion activity from the input bitstream and supply it directly to the decimation controller 26.

Bitstream Multiplexing

A concept of the present invention on moving-picture bitstream multiplexing is that a code amount control is performed after multiplexing a several moving-picture bitstreams transferred from encoders, that include bitstreams of first pictures (I- or P-pictures in the MPEG standard) to be used as reference pictures for inter-picture prediction and bitstreams of second pictures other than the first pictures, with decimation of the bitstreams of the second pictures (B-pictures in the MPEG standard) before multiplexing.

The bitstreams of the second pictures can be decimated with no affection to reproduction of the bitstreams of the first pictures because the second pictures are not used as reference pictures for inter-picture prediction. The present invention is therefore applicable to bitstreams that have already been coded, with no feedback of control information to moving-picture encoders.

Another concept of the present invention on moving-picture bitstream multiplexing is decimation control according to motion activity so that decimation is performed mainly on picture portions of a low motion activity for which un-smooth motion will not be noticeable even though a picture rate is lowered by decimation rather than picture portions of a high motion activity for which un-smooth motion will be noticeable if a picture rate is lowered by decimation, for keeping picture quality which would otherwise be degraded.

Figure 7:
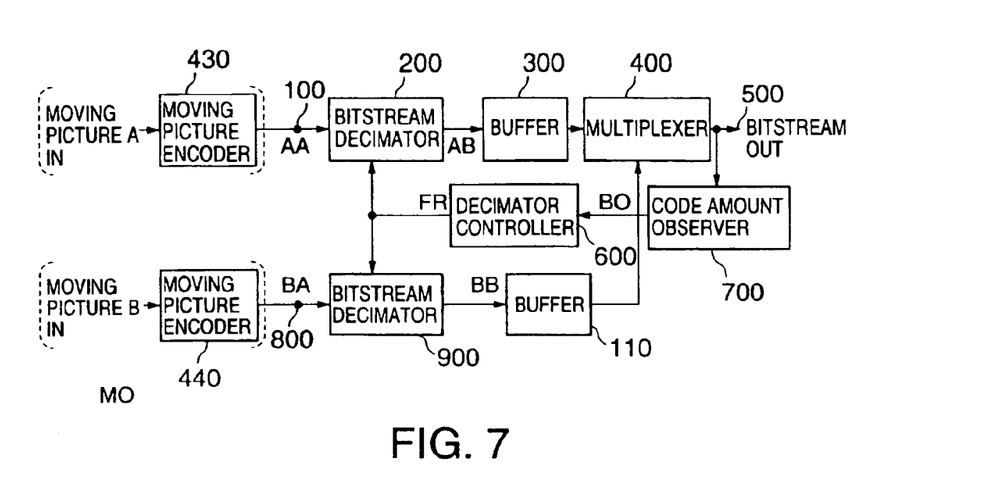
FIG. 7 shows a block diagram of the first preferred embodiment of a moving-picture bitstream multiplexing apparatus according to the present invention.

Disclosed next with reference to FIG. 7 is the first preferred embodiment of a moving-picture bitstream multiplexing apparatus according to the present invention.

Bit streams AA and BA that are supplied to the multiplexing apparatus shown in FIG. 7 have been obtained by moving picture coding apparatus 430 and 440, respectively. In detail, the moving picture coding apparatus 430 and 440 have processed moving pictures A and B, respectively, by encoding the pictures under the MPEG-2 standard at a 6-frame segment between P- or I-pictures to obtain the bitstreams AA and BA, respectively, of 480 p (progressive) pictures (720×480 pixels, 60 frames/sec.).

The bit streams AA and BA are supplied to bitstream decimators 200 and 900 through input terminals 100 and 800, respectively. Each decimator decimates B-pictures from the input bitstream at a picture rate (or a decimation rate) FR supplied by a decimation controller 600. The picture rate FR is set in the range from 60fps to 10 fps (frame per second).

B-pictures are decimated according to the picture rate FR, the same as shown in FIG. 3. B-pictures to be decimated are decided so that the remaining B-pictures and the preceding and the following I(P)-pictures after decimation are arranged at a constant interval.

The bitstreams AA and BA subjected to decimation as above are converted into bitstreams AB and BB and supplied to buffers 300 and 110, respectively. The buffers 300 and 110 hold intermittent (due to decimation) input of the bitstreams AB and BB, respectively, for several frames, and supply the bitstreams to a multiplexer 400.

The multiplexer 400 receives bitstreams AB and BB at a ratio in proportion to their bit rates and multiplexes them to one bitstream. The bitstreams AB and BB are multiplexed as bitstreams of almost the same timing at a fixed total transfer rate of the bitstreams. The multiplexed bitstream at a fixed transfer rate is output through an output terminal 500 and also supplied to a code amount observer 700.

The code amount observer 700 has a virtual buffer that corresponds to a buffer of an MPEG-decoder. The code amount observer 700 observes buffer occupancy (BO) on the virtual buffer and varies the buffer occupancy by taking out a bitstream from the virtual buffer for reproduction of each frame, to output a value BO that has been normalized by the total virtual buffer capacity.

Discussed next is B-picture decimation control.

The decimation controller 600 controls a decimation rate (or a picture rate) for B-pictures, as listed below according to the normalized virtual buffer occupancy value BO. The picture rate is lowered as each frame code amount becomes larger and the virtual buffer becomes empty whereas it is raised as the code amount becomes smaller and the virtual buffer becomes full.

FR=60 fps . . . $0.6 < BO$
FR=30 fps . . . $0.4 < BO \leq 0.6$
FR=20 fps . . . $0.2 < BO \leq 0.4$
FR=10 fps . . . $BO \leq 0.2$ The code amount is unchanged at a picture rate FR=60 fps, however, it is decimated to almost 30%, 40% and 50% at FR=30 fps, 20 fps and 10 fps, respectively. A picture rate is almost 35 fps on average at a decimation rate of 25% on average.

Figure 8:
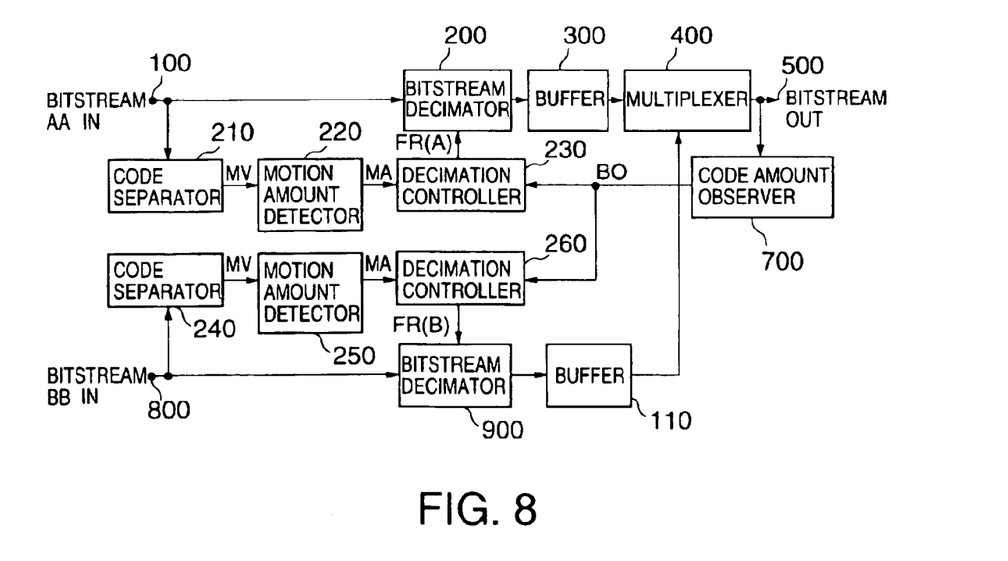
FIG. 8 shows a block diagram of the second preferred embodiment of a moving-picture bitstream multiplexing apparatus according to the present invention.

Disclosed next with reference to FIG. 8 is the second preferred embodiment of a moving-picture bitstream multiplexing apparatus according to the present invention.

Elements in this embodiment that are the same as or analogous to elements in the first embodiment (FIG. 7) are referenced by the same reference numbers and will not be explained in detail.

Bitstreams AA and BA obtained as disclosed with respect to FIG. 7 are supplied to code separators 210 and 240, respectively. Motion vectors (MVs) are detected for inter-picture prediction and supplied to motion amount detectors 220 and 250.

The motion amount detectors 220 and 250 detect motion activity (MA) based on the input motion vectors to be used for P-picture prediction for each segment between a P-picture and the next P-picture for 0.1 seconds. The detected motion activity are supplied to decimation controllers 230 and 260.

Motion activity is detected by using a horizontal component MVx (i, j) and a vertical component Mvy (i, j) of a motion vector used for P-picture coding in which "i" and "j" indicate horizontal and vertical positions, respectively, on one frame when movement of one pixel is 1.0. Motion activity MA1 for the entire frame is obtained according to the expression (1) already disclosed.

An incoming bitstream caries intra-coded blocks with no motion vectors for I- and P-pictures. For I-pictures, the motion amount detector 32 applies distance compensation to a motion vector of the preceding B-picture to obtain motion activity. On the other hand, for intra-coded blocks of P-pictures, a predetermined relatively large motion vector is applied thereto to obtain motion activity because such blocks often carry moving pictures of rapid movement.

The decimation controllers 230 and 260 performs picture rate FR (decimation rate) control and supply data FR(A) and FR(B) to bitstream decimators 200 and 900, respectively.

A moving-picture video signal mostly carries 60 frames (or fields) according to a limit on detection of a flicker on screen, however, such number of frames (or fields) are not always required for every moving picture. For example, cinema films require 24 frames per second (fps), so that un-smooth movement (jaggy movement, etc.) is noticeable only for rapidly moving scenes at 30 fps, however, not noticeable at 20 fps whereas noticeable at 10 fps except stationary scenes.

Therefore, picture rate (decimation rate) control in which the rate is switched (even the virtual buffer occupancy BO is the same) among 60 fps only for rapid movement, 30 fps for frequent movement, 20 fps for infrequent movement, and 10 fps for almost stationary scenes offers smooth and natural movement on screen when moving pictures are reproduced.

Figure 9:
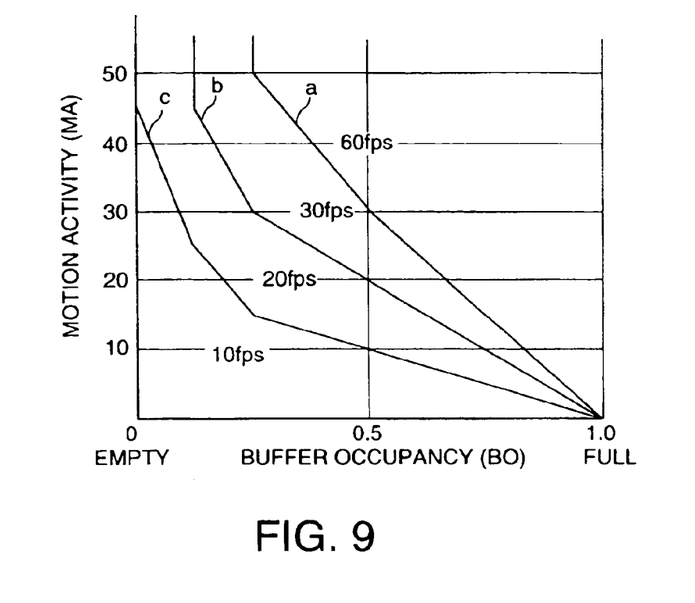
FIG. 9 illustrates decimation control according to motion activity and buffer occupancy obtained in the second embodiment shown in FIG. 8.

The picture rate is decided as illustrated in FIG. 9 according to motion activity (MA) and virtual buffer occupancy (BO). As illustrated, buffer occupancy closer to zero (almost empty) allows decrease in picture rate (decimation rate) whereas BO closer to 1.0 (almost full) allows increase in picture rate (decimation rate). Lines "a", "b" and "c" in FIG. 9 are the borders between 60 fps and 30 fps, 30 fps and 20 fps, and 20 fps and 10 fps, respectively.

Figure 10:
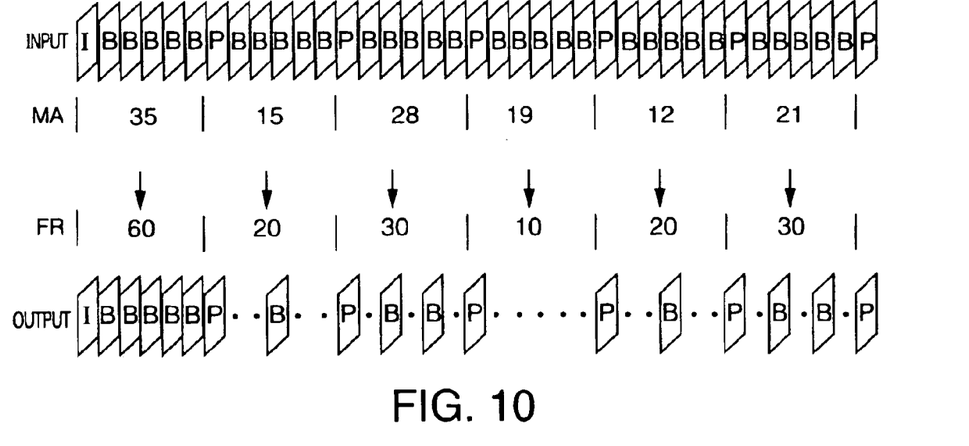
FIG. 10 illustrates B-picture decimation according to motion activity obtained in the second embodiment shown in FIG. 8.

Illustrated in FIG. 10 is B-picture decimation at BO=0.5. Each bitstream is subjected to control according to motion activity (MA) to set frame (picture) rate FR (decimation rate) for B-picture decimation. Moving-picture bitstreams after multiplexing are controlled at a predetermined transfer rate.

As disclosed, according to the moving picture coding and moving-picture bitstream conversion in the present invention, motion activity of a moving picture is detected for controlling decimation of pictures which will not be used as reference pictures for inter-picture prediction, thus achieving a low code transfer rate (transfer bit rate) with maintaining moving picture quality, such as, smooth movement on screen.

Moreover, according to the present invention, decimation of pictures which will not be used as reference pictures for inter-picture prediction can be performed step by step, thus achieving fine picture rate adjustment for obtaining an optimum picture rate for human visual detection capability on movement. The present invention therefore offers a bitstream of low transfer bit rate while maintaining high reproduced picture quality.

Moreover, according to moving-picture bitstream multiplexing in the present invention, a code amount control is performed after multiplexing a several moving-picture bitstreams transferred from encoders, that include bitstreams of first pictures (I- or P-pictures in the MPEG standard) to be used as reference pictures for inter-picture prediction and bitstreams of second pictures other than the first pictures, with decimation of the bitstreams of the second pictures (B-pictures in the MPEG standard) before multiplexing.

The bitstreams of the second pictures can be decimated with no affection to reproduction of the bitstreams of the first pictures because the second pictures are not used as reference pictures for inter-picture prediction. The present invention is therefore applicable to bitstreams that have already been coded, with no feedback of control information to moving-picture encoders.

The present invention thus achieves an optimum code amount decrease, by multiplexing, in bitstreams that have been coded at and transferred from a remote place and also bitstreams that have been coded and stored in storage media.

Furthermore, according to the present invention on moving-picture bitstream multiplexing, decimation is controlled according to motion activity so that decimation is performed mainly on picture portions of a low motion activity for which un-smooth motion will not be noticeable even though a picture rate is lowered by decimation rather than picture portions of a high motion activity for which un-smooth motion will be noticeable if a picture rate is lowered by decimation. Thus, the present invention achieves a lower transfer bit rate for a multiplexed bitstream while keeping picture quality which would otherwise be degraded.

What is claimed is:

1. A bitstream conversion apparatus comprising:

a bitstream receiver to receive an incoming first moving-picture bitstream at a first code transfer rate in which the incoming first moving-picture bitstream has already been obtained by coding first pictures set at a predetermined interval and used as reference pictures for inter-picture prediction of a moving picture to be coded and coding second pictures different from the first pictures;

a motion amount detector to obtain motion activity from information on activity carried by the incoming first moving-picture bitstream;

a decimation controller to set a decimation rate on the second pictures of the incoming first moving-picture bitstream according to at least the motion activity; and a bitstream decimator to decimate only bitstreams of the second pictures from the incoming first moving-picture bitstream at another predetermined interval according to the decimation rate, thus outputting a second moving-picture bitstream at a second code transfer rate different from the first code transfer rate.

2. A bitstream conversion method comprising the steps of:

receiving an incoming first moving-picture bitstream at a first code transfer rate in which the incoming first moving-picture bitstream has already been obtained by coding first pictures set at a predetermined interval and used as reference pictures for inter-picture prediction of a moving picture to be coded and coding second pictures different from the first pictures;

obtaining motion activity from information on activity carried by the incoming first moving-picture bitstream;

setting a decimation rate on the second pictures of the incoming first moving-picture bitstream according to at least the motion activity;

decimating only bitstreams of the second pictures from the incoming first moving-picture bitstream at another predetermined interval according to the decimation rate; and outputting a second moving-picture bitstream at a second code transfer rate different from the first code transfer rate.

* * * * *